United States Patent [19]

Rudy, Jr. et al.

[11] Patent Number: 4,904,879

[45] Date of Patent: Feb. 27, 1990

[54] DATA CURRENT COUPLER AND METHODS OF MAKING AND ASSEMBLING SAME

[75] Inventors: William J. Rudy, Jr., Annville; Howard R. Shafter, Millersburg, both of Pa.

[73] Assignee: AMP Incorporated, Harrisburg, Pa.

[21] Appl. No.: 252,285

[22] Filed: Sep. 30, 1988

[51] Int. Cl.[4] .......................... H02J 3/00; H01P 5/12
[52] U.S. Cl. .................................... 307/17; 29/602.1;
29/609; 307/148; 333/100; 336/73; 361/395;
361/424
[58] Field of Search ............................. 307/17, 89-91,
307/147, 148; 336/65, 73, 90, 96, 175; 333/100;
174/35 R, 52.2; 361/380, 392, 395, 424, 428;
29/602.1, 609

[56] References Cited

U.S. PATENT DOCUMENTS

| | | |
|---|---|---|
| 3,504,188 | 3/1970 | Ficker . |
| 3,727,174 | 4/1973 | Podmore et al. . |
| 3,742,408 | 6/1973 | Jaeger ................................... 336/5 |
| 4,264,827 | 4/1981 | Herzog ................................. 307/17 |
| 4,628,410 | 12/1986 | Goodman et al. . |
| 4,628,809 | 12/1986 | Das ....................................... 29/609 |
| 4,682,829 | 7/1987 | Kunkle et al. . |
| 4,808,115 | 2/1989 | Norton ................................ 361/395 |
| 4,811,165 | 3/1989 | Currier ................................ 361/395 |

OTHER PUBLICATIONS

AEEC Letter No. 87-094/SAI-309, Jul. 17, 1987, pp. 1,7,9; Aeronautical Radio Inc., Annapolis, MD.
AEEC Letter No. 87-122/SAI-313, Sep. 17, 1987, pp. 1,38,44; Aeronautical Radio, Inc., Annapolis, MD.
AEEC Letter No. 88-077/SAI-331, May 20, 1988, pp. 1,12; Aeronautical Radio, Inc., Annapolis, Md.
Ferroxcube Catalog, Seventh Ed. 1984, "Linear Ferrite Materials & Components", pp. 4-1, 4-2, 4-5, Ferroxcube Division of Amperex Electronic Corporation, Saugerties, N.Y.
Southco Fasteners Handbook 37, "Assembly and Design Fasteners", pp. B-5, B-6, B-14; Southco, Inc. Concordville, Pa.
AMP Catalog, 79-547, Rev. 1-85, "Amplimite Subminiature D Pin and Socket Connectors per MIL--C-24308", p. 11, AMP Incorporated, Harrisburg, Pa.

Primary Examiner—Gerald P. Tolin
Attorney, Agent, or Firm—Anton P. Ness

[57] ABSTRACT

A coupler assembly for noninvasive coupling to conductor wires of a twisted pair cable of a data bus uses mating pairs of E-shaped electromagnets defining a pair of electromagnet cores having windings about central legs thereof electrically connected to a control unit for sensing and transmitting signals along the data bus. A lower member with lower electromagnets is mounted to a panel, while an upper member with upper electromagnets includes a circuit substrate having trace windings about substrate apertures receiving the central legs of the upper electromagnets, an electronic subassembly to which the windings are electrically connected to amplify signals received and signals to be sent, and a shielded electrical connector secured at a connector end connected to circuits of the electronic subassembly and matable with a connector of a cable extending to the control unit. After the conductor wires are placed in channels between the legs of the lower electromagnets through the lower member, the upper member is rotated at the connector end for its coupler end containing the upper electromagnets to mate with the coupler end of the lower member containing the lower electromagnets, whereafter the members are fastened.

10 Claims, 16 Drawing Sheets

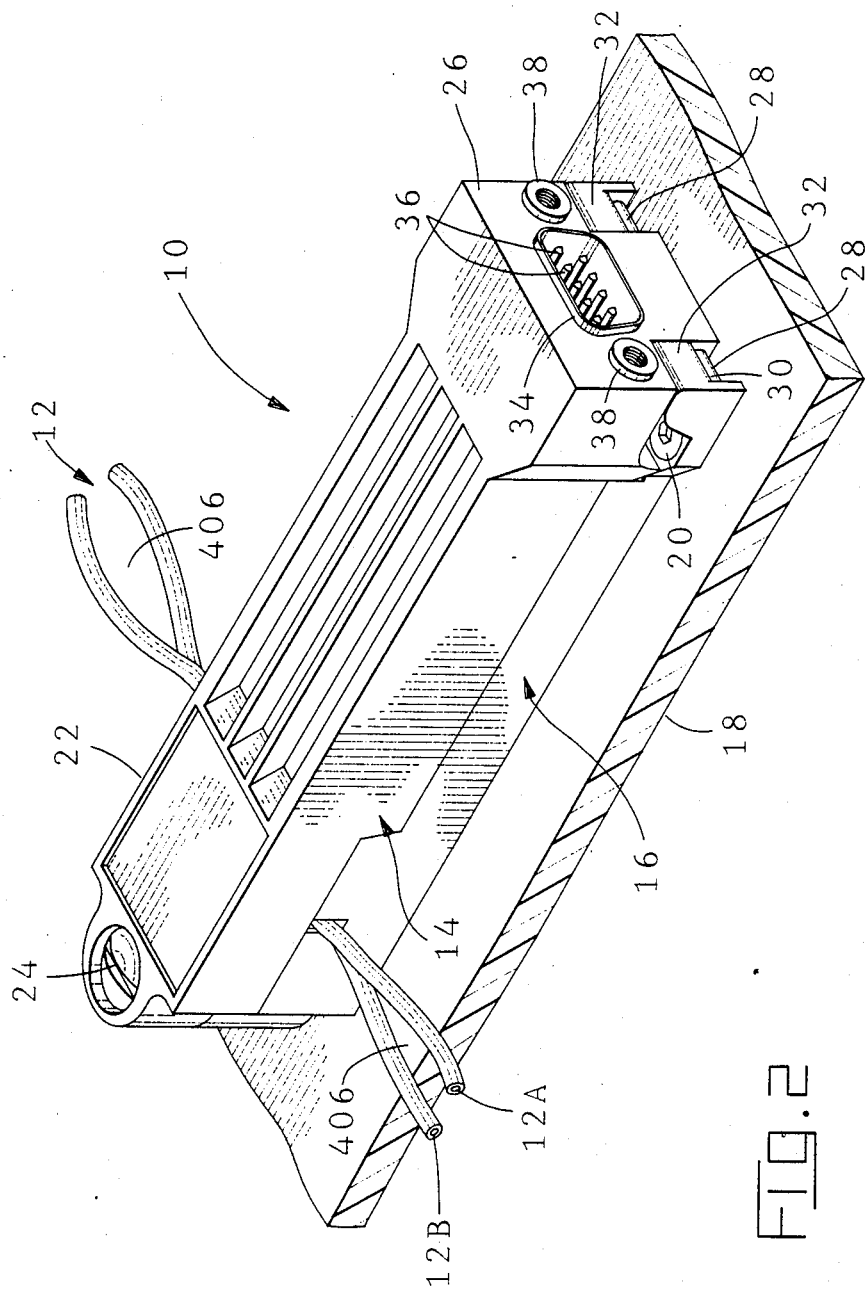

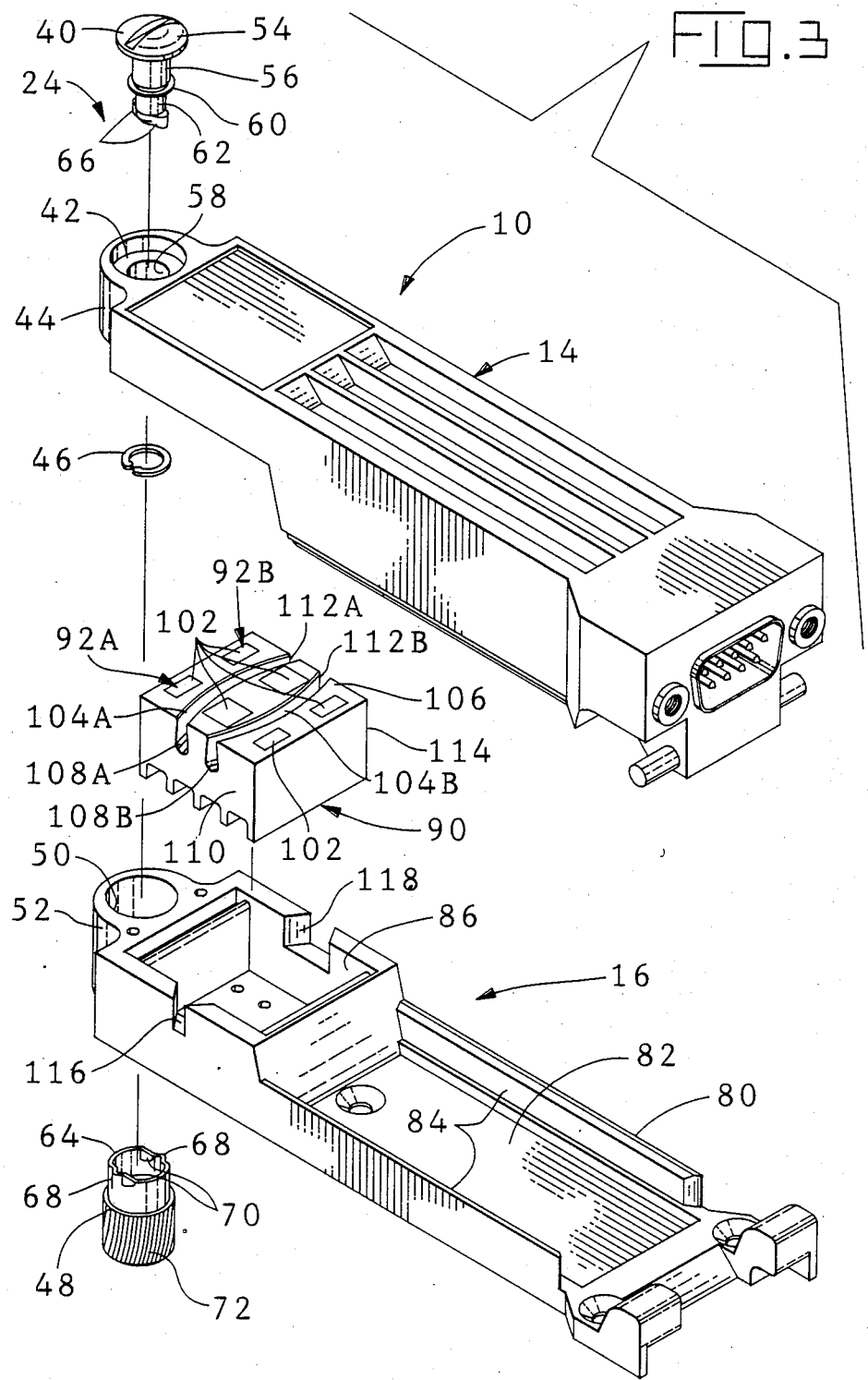

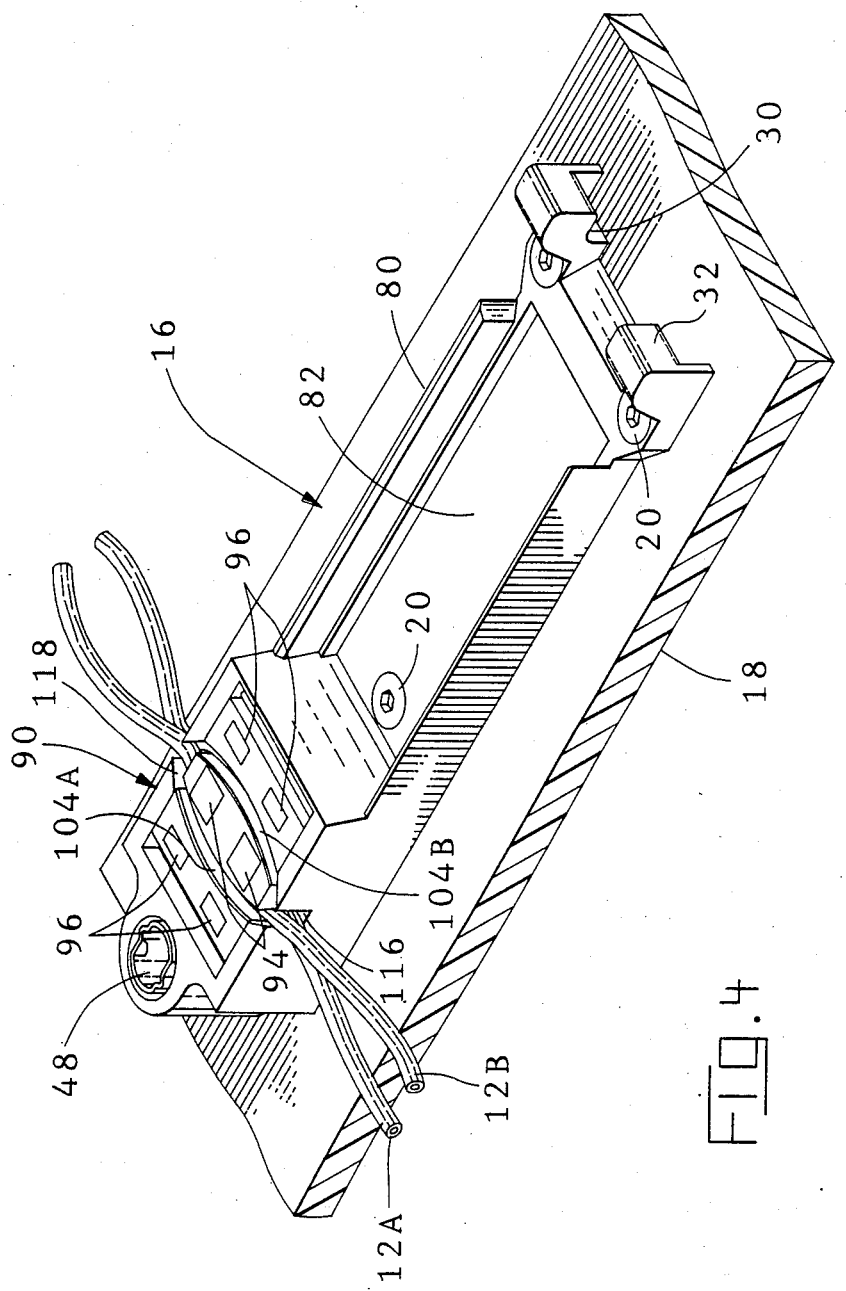

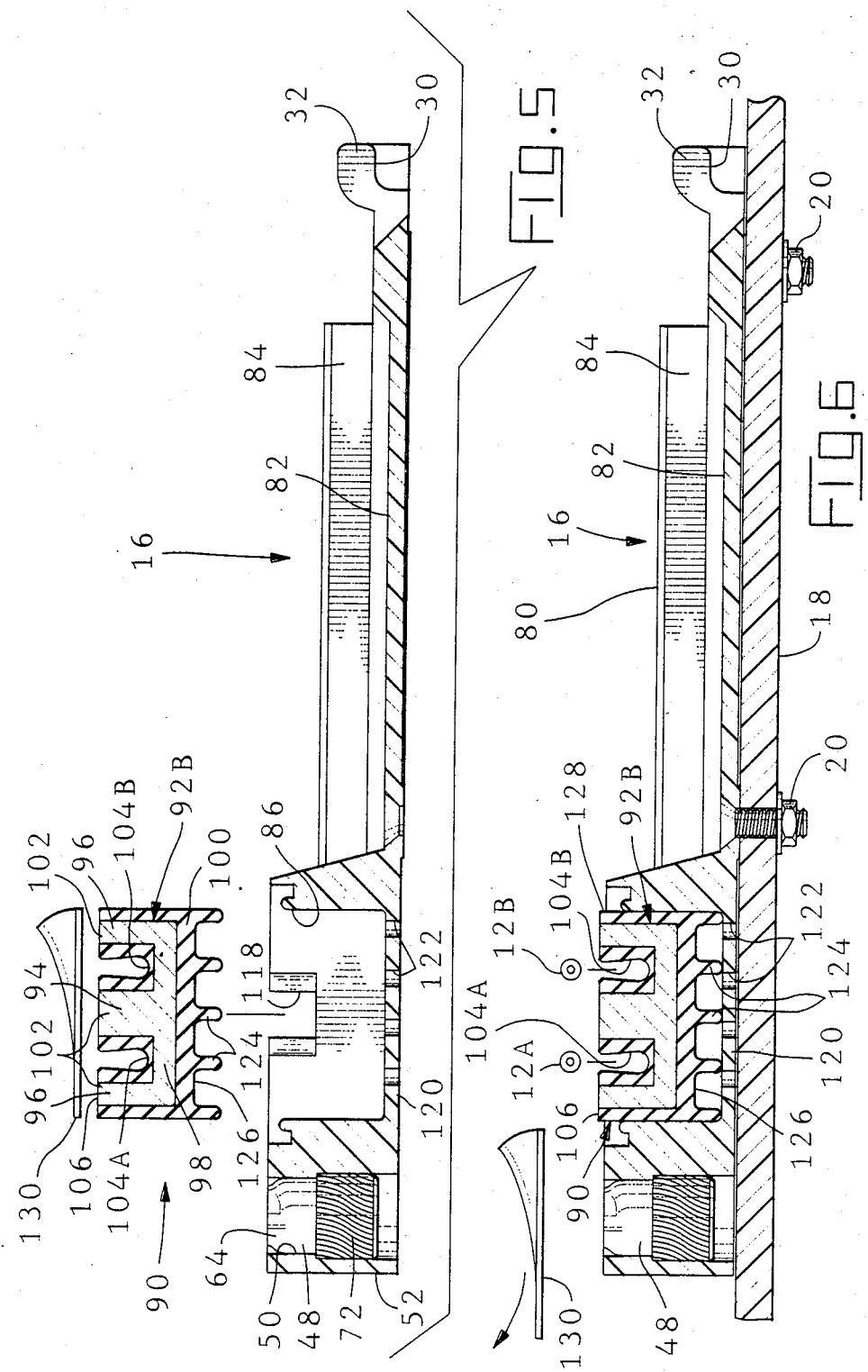

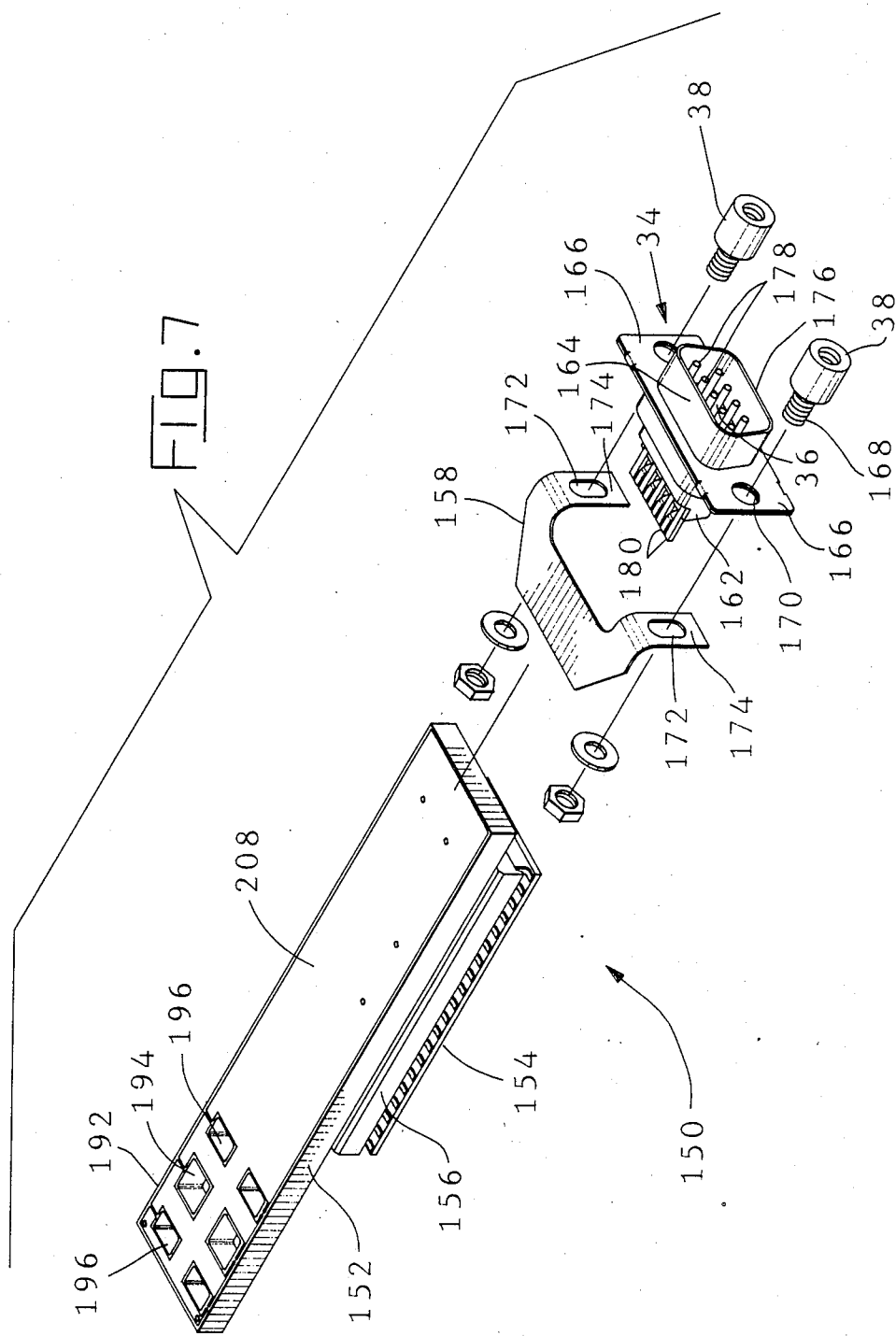

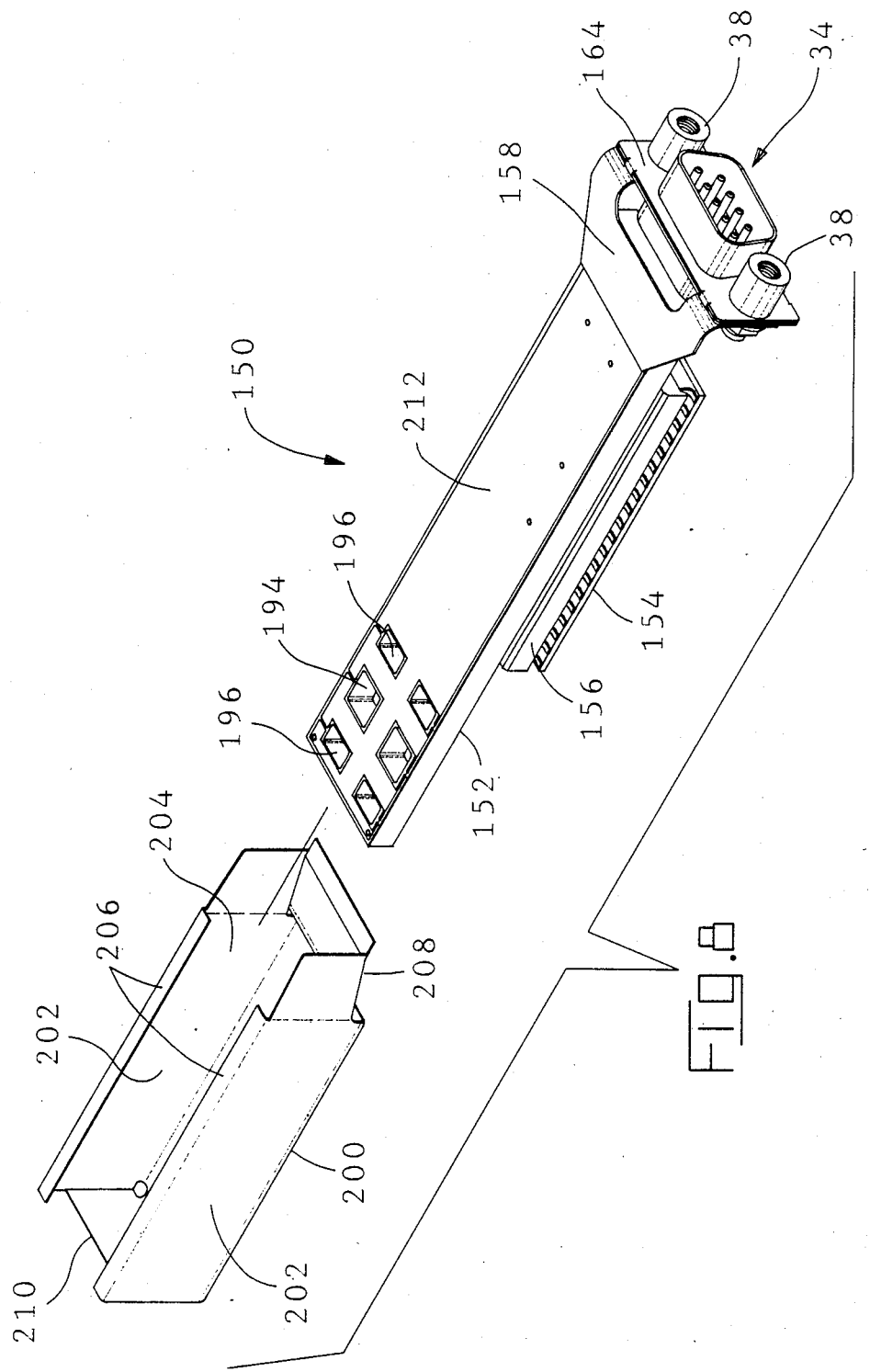

DATA CURRENT COUPLER AND METHODS OF MAKING AND ASSEMBLING SAME

FIELD OF THE INVENTION

The present invention relates to the field of electrical connectors and more particularly to couplers for sensing and transmitting electrical signals.

BACKGROUND OF THE INVENTION

U.S. Pat. No. 4,264,827 discloses a method of sensing the transmission of low-level signal current through an electrical conductor without an electrical connection to the conductor, using a continuous closed loop conductor wire extending from a current source with coils of the conductor looped around magnetic coil articles connected to electronic devices, which arrangement senses changes in the electromagnetic field established by the current. The arrangement can be repeated at a plurality of locations spaced along the conductor without detrimental effect to the signal transmission, and can allow signaling of a plurality of electronic devices in response to the signal current passing through the conductor.

Such a current sensing system is desired to be placed aboard aircraft for use with black boxes and other electronic control units, as is disclosed in Proposed ARINC Standard 629 presently being considered by the Airlines Electronic Engineering Committee (AEEC) of Aeronautical Radio, Inc. (ARINC) of Annapolis, Md., and AEEC Letters Nos. 87-094/SAI-309, 87-122/SAI-313, and 88-077/SAI-331, which are incorporated herein by reference. Such a system may also be used in other environments where it is desired that a single closed loop data bus be used.

It is desired to devise a package for housing a coupling system for use in a current sensing arrangement, and a method of assembly of such a system.

SUMMARY OF THE INVENTION

The present invention is an assembly including a lower member to which is secured an upper member forming an assembly for noninvasive coupling to a twisted pair of signal conductor wires of a closed loop data bus to read signals being transmitted therealong by a series of electromagnetic cores interlaced with loops of the twisted pair. The electromagnetic cores comprise pairs of opposing E-shaped ferrite electromagnets each member of which is disposed within one or the other of the upper and lower members. Opposing end faces of the legs of the E-shaped electromagnets engage each other preferably under slight compression after portions of the individual wires of the twisted conductor pair at a selected location therealong are placed in channels extending through the legs of the electromagnets in the lower member, upon the upper member then being secured to the lower member. The assembly also can transmit and amplify signals therealong by generating an appropriate electromotive force via an electromagnetic field, and also receive and therefor verify the signal it transmits.

Embedded within the dielectric material covering the upper member is an electronic package including a multilayer printed circuit board containing layers of traces forming coils about the center legs of the electromagnet cores, electrically connected to an electronic subassembly connected to the board. In turn the electronic subassembly is electrically connectable at a connector interface of the upper member with a cable assembly which extends to a corresponding control unit, with the control unit providing electrical power to the electronic subassembly as well as signal and ground connection. The upper member includes shielding completely around the electronic subassembly and the connections thereof with the connector interface for EMI/RFI protection, which is then covered by an insulative covering.

It is an objective of the present invention to provide a housing for the components of a data current coupler.

It is a further objective to provide such a coupler housing which protects the components from EMI/RFI.

It is a further objective that such a coupler minimize the dissipation of the strength of signals passing through the data bus system and not interfere with the integrity of the signals through impedance.

It is yet a further objective to provide such a coupler housing which physically protects and seals the coupler components over long-term in-service use.

It is an additional objective to provide such a coupler assembly which is compact and minimal in size to permit close spacing with like others along a data bus system.

It is another objective to provide a coupler housing which is easy to assemble into a data bus system and be disassembled therefrom.

BRIEF DESCRIPTION OF THE DRAWINGS

FIG. 2 is a an isometric view of the coupler assembly of the present invention coupled to a pair of conductor wires of the data bus of FIG. 1;

FIG. 3 illustrates the upper member exploded from the lower member of the coupler of FIG. 2 and the fastener, with the electromagnet insert exploded from the lower member;

FIG. 4 is an isometric view showing the lower member assembled and mounted to a panel, with the data bus wires secured in place in channels of the electromagnet insert;

FIGS. 5 and 6 are longitudinal views of the lower member being assembled and mounted;

FIGS. 7 to 9 are isometric views of the parts of the upper member including the electronic package, connector and shield being assembled;

DETAILED DESCRIPTION OF THE PREFERRED EMBODIMENT

Figure 1:
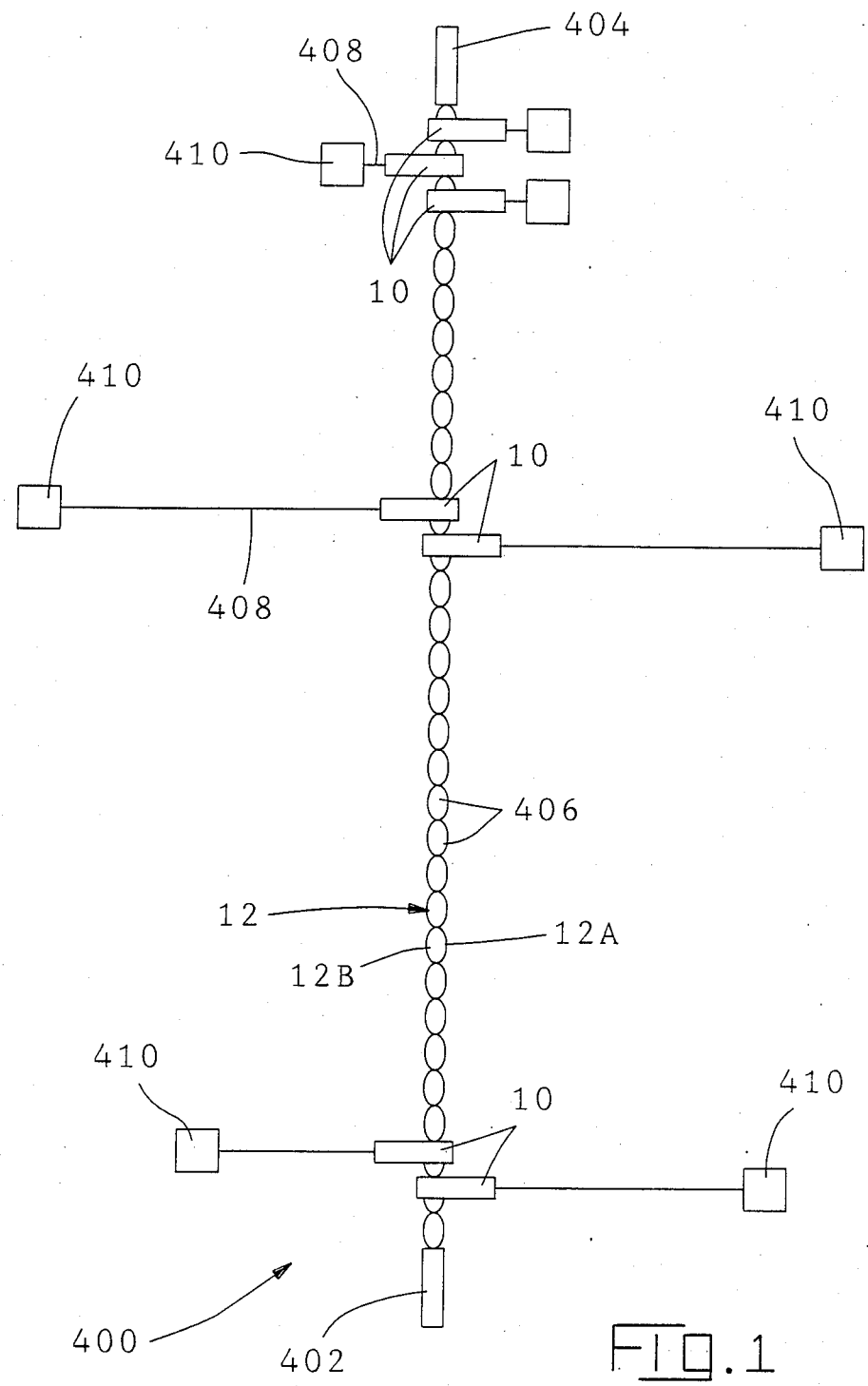
FIG. 1 is a diagrammatic view of a data bus system.
Figure 9:
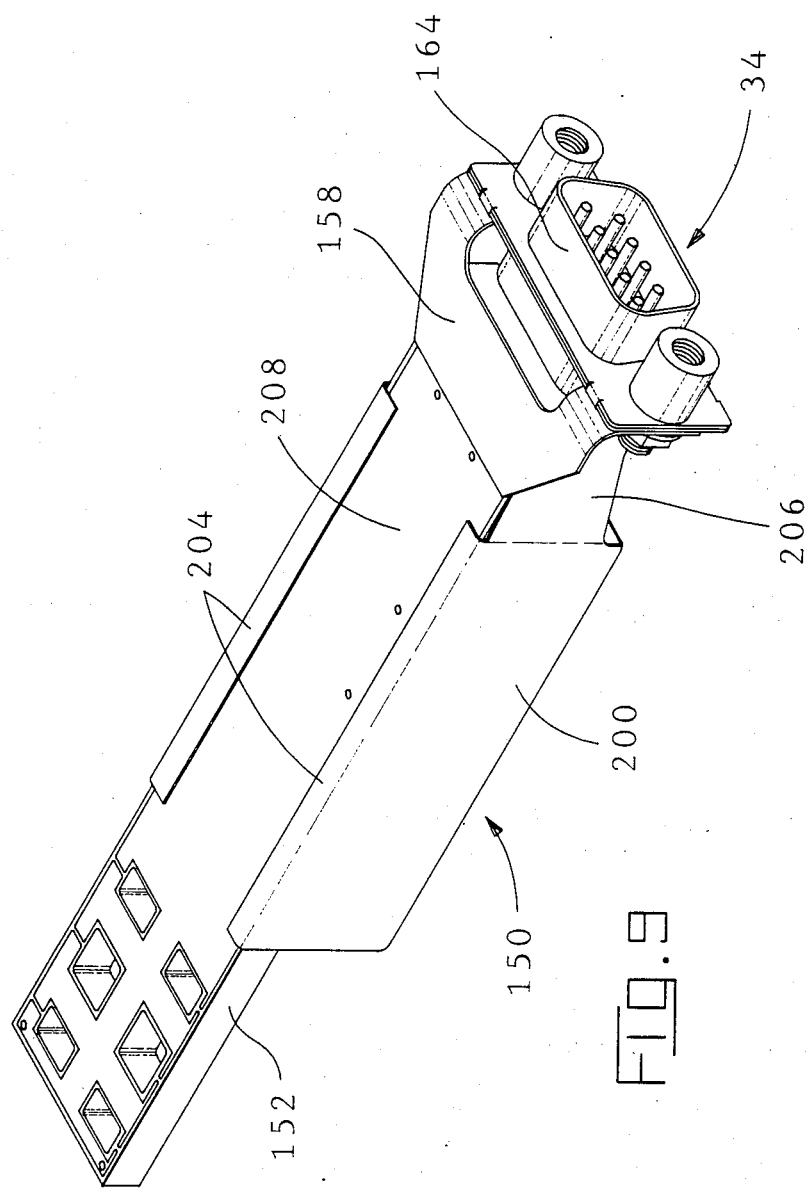

FIG. 1 is a representation of the data bus system 400 to which the present invention is relevant. A twisted pair cable 12 of conductor wires 12A,12B extends between end terminations 402,404 and comprises a closed loop, and a plurality of loops 406 occur at selected spacing, each loop having a length and shape selected to minimize impedance effects and signal reflection. At selected ones of loops 406 are mounted coupler assemblies 10 each having a width preferably less than a loop length to avoid distorting the desired loop length and shape, thereby avoiding impedance effects and signal reflection. Stub cables 408 extend from respective couplers 10 to respective control units 410 such as black boxes, providing electrical connections therebetween. Each control unit 410 preferably has a Serial Interface Module (not shown) for modifying digital signals into Manchester Encoded Signals to be transmitted along the data bus system, and correspondingly for translating such encoded signals into digital signals for integrated circuits within the control unit. Each control unit 410 will also provide power for the amplifiers in the couplers 10 to boost received and transmitted signals.

FIGS. 2 to 4 illustrate the coupler assembly 10 of the present invention coupled to the twisted pair 12 of conductor wires 12A,12B of a data bus system such as that of FIG. 1 and as disclosed in U.S. Pat. No. 4,264,827 and the AEEC Letters referred to herein. Coupler assembly 10 is noninvasively affixed at a selected location therealong at a loop 406 of the twisted pair. Coupler assembly 10 comprises an upper member 14 and a lower member 16, with lower member 16 comprising a base mounted to a panel 18 by fasteners 20 such as bolts or self-tapping screws. Upper member 14 is fastened to lower member 16 about wires 12A,12B at coupling section 22 by fastener means 24 and at connector section 26 by pivot pins 28 held by and rotatable against arcuate bearing surfaces 30 of bosses 32. Connector section 26 includes a receptacle connector 34 including a plurality of terminals 36 matable with a plug connector (not shown) terminating the end of a stub cable 408 of FIG. 1 connected to a control unit or black box 410. Threaded inserts 38 such as female screwlocks are shown for fastening the receptacle connector 32 and plug connector together upon mating.

Figure 12:
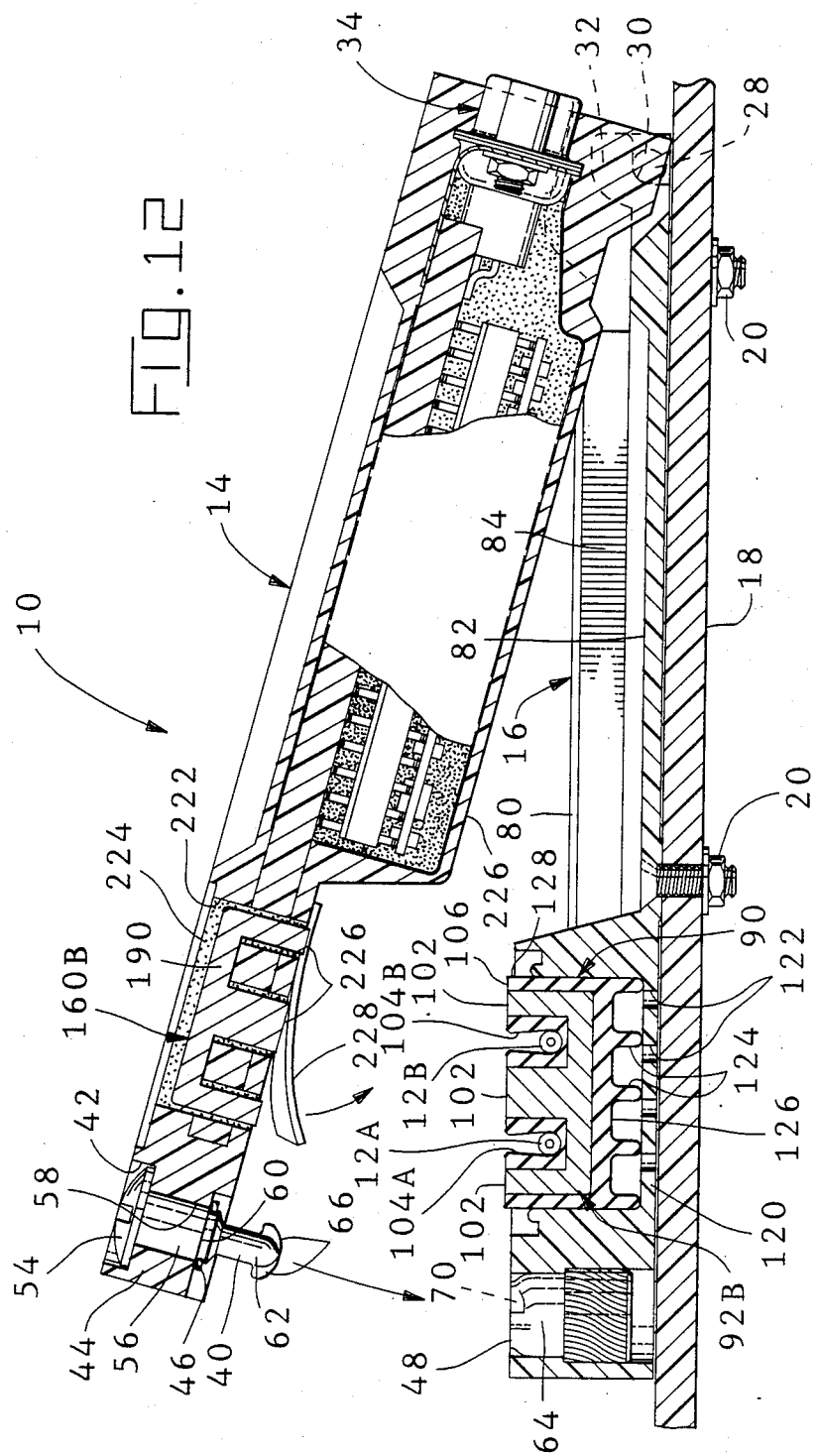
FIGS. 12 and 13 are longitudinal views of the upper and lower members being secured together to couple to the data bus wires.

Referring to FIGS. 3 and 12 fastener means 24 can be one-quarter-turn fasteners of the type sold by Southco, Inc. of Lester, Penna. under Part Nos. 82-11-240-16, 82-32-101-20, and 82-99-205-15. Such fasteners comprise a screw 40 received through profiled aperture 42 of end flange 44 of upper member 14 and held therein by C-shaped retention ring 46, and cooperable with socket 48 secured within profiled aperture 50 of end flange 52 of lower member 16 to lock the upper and lower members together following full assembly. Screw 40 has enlarged head 54 adapted to be rotated by a screwdriver to lockingly engage socket 48; a shaft 56 slightly smaller than hole portion 58 of profiled aperture 42 to permit rotation; groove 60 to receive retention clip 46 thereinto after insertion of screw 40 into profiled aperture 42; and locking end 62 extending to be received into socket section 64 of socket 48 upon full assembly. Locking end 62 includes a pair of wing tabs 66 received along channels 68 formed at the top of socket section 64 whereafter upon appropriate rotation of screw 40 by a tool, wing tabs 66 override and latch behind stop surfaces defined by inward bosses 70 formed in the top portion of socket section 64. Socket 48 includes a knurled enlarged head 72 which is held firmly within profiled aperture 50 after being force fit thereinto. Fastener means 24 permits disassembly if desired, and other fastening mechanisms can optionally be used.

In FIGS. 3 to 6 lower member 16 includes a body member 80 molded of dielectric plastic material such as nylon and includes an enlarged channel-shaped central recess 82 defined between walls 84, and an insert-receiving cavity 86. Electromagnet insert 90 comprises a pair of E-shaped electromagnets 92A,92B having a central leg 94 and outer legs 96 extending from transverse portion 98. Electromagnets 92A,92B are preformed ferrite cores embedded within insert body 100 of elastomeric material such as silicon rubber such that faces 102 of legs 94,96 are exposed to engage with corresponding exposed faces 220 of legs of corresponding E-shaped electromagnets 160A,160B (FIG. 12) secured within upper member 14 upon assembly. Exposed faces 102 are preferably coated with a grease to prevent oxidation. Electromagnet insert 90 includes a pair of gently arcuate channels 104A,104B across upper surface 106 from first channel ends 108A,108B at first side 110 to second channel ends 112A,112B at second side 114 and between legs 94,96 of electromagnets 92A,92B such that arcuate channels 104A,104B are conVex aWay from each other. Data bus wires 12A,12B will be received and held along the channel bottoms because the channel walls above the bottom are closer together than the wire diameter; the wires will course along arcuate channels 104A,104B between outer legs 96 and inner leg 94 of each of electromagnets 92A,92B upon assembly. The particular arcuate nature of the arcuate channels is selected to hold the wires in the shape of a loop 406 which reduces impedance and minimizes reflectivity of signal transmission along the wires.

Electromagnet insert 90 is received into and secured within insert-receiving cavity 86 preferably under interference fit. Upon assembly first wire-receiving slot 116 at the top of insert-receiving cavity 86 aligns with first channel ends 108A,108B and second wire-receiving slot 118 aligns with second channel ends 112A,112B so that both wires 12A,12B are received together through first slot 116 and then into respective first channel ends 108A,108B and along the channels to second channel ends 112A,112B and together through second slot 118.

In FIGS. 5 and 6 fastener socket 48 of lower member 16 is shown force-fit within profiled aperture 50 through flange 52 and held therein against rotation by reason of for example knurling on enlarged head 72. Bottom wall 120 of insert-receiving cavity 86 has a plurality of holes 122 therethrough for the venting of air upon insertion of electromagnet insert 90 into cavity 86 under interference fit. Electromagnet insert 90 has a plurality of deformable lateral ribs 124 molded into bottom surface 126 which will act as spring members to permit insert body 100 to sustain further compression when urged downwardly by upper assembly 14 which will be explained with reference to FIGS. 12 and 13. After electromagnet insert 90 is secured within cavity 86 greased end faces 102 of electromagnet legs 94,96 are covered with a protective paper 130, which will be removed just prior to placement of wires 12A,12B into channels 104A,104B. In FIG. 6 upper surface 106 of electromagnet insert 90 is shown at 128 to be preferably raised slightly above the top of insert-receiving cavity 86 prior to complete assembly of coupler assembly 10;

lower member 16 is shown mounted to panel 18 by fasteners 20, and wires 12A,12B are in place in channels 104A,104B.

Figure 10:
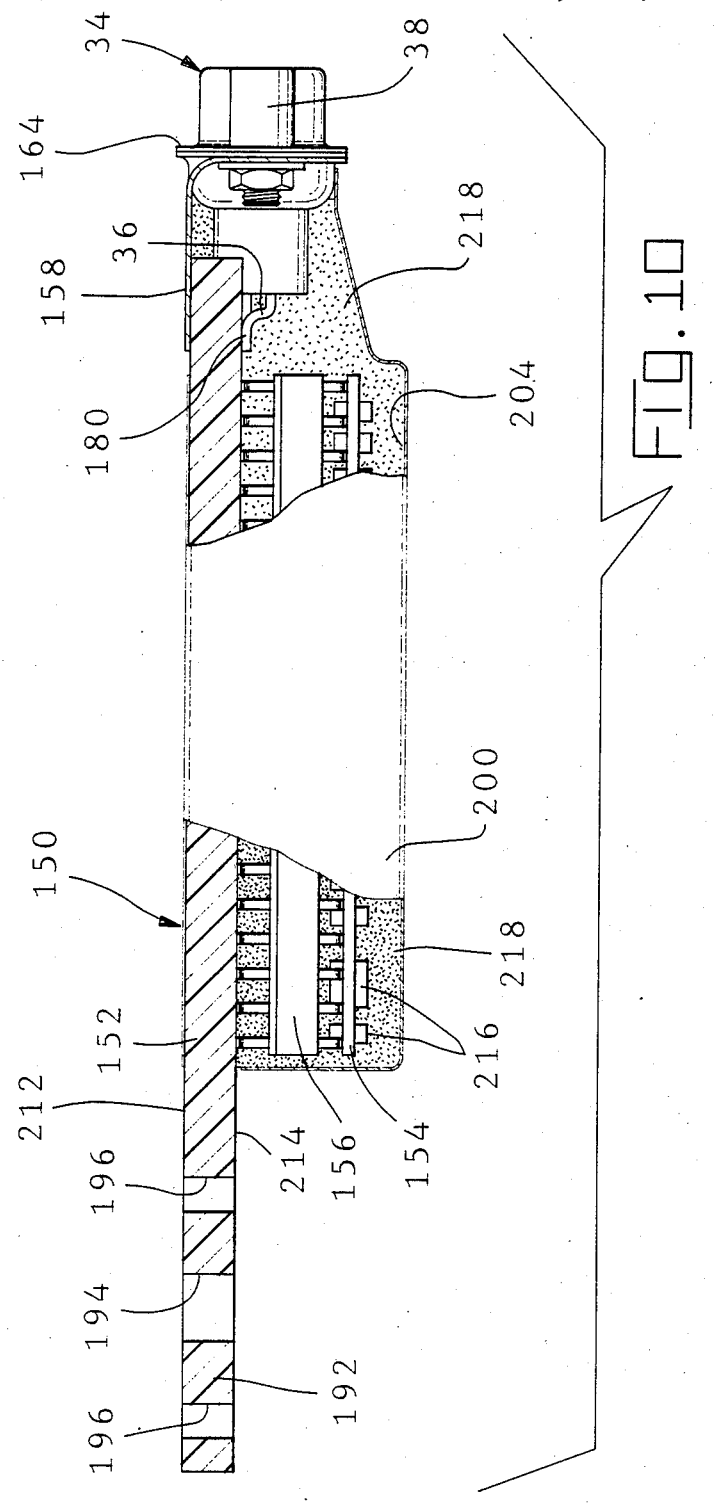
FIGS. 10 and 11 are longitudinal section views of the upper assembly being sealed and overmolded, after which the electromagnet is to be secured thereto.
Figure 11:
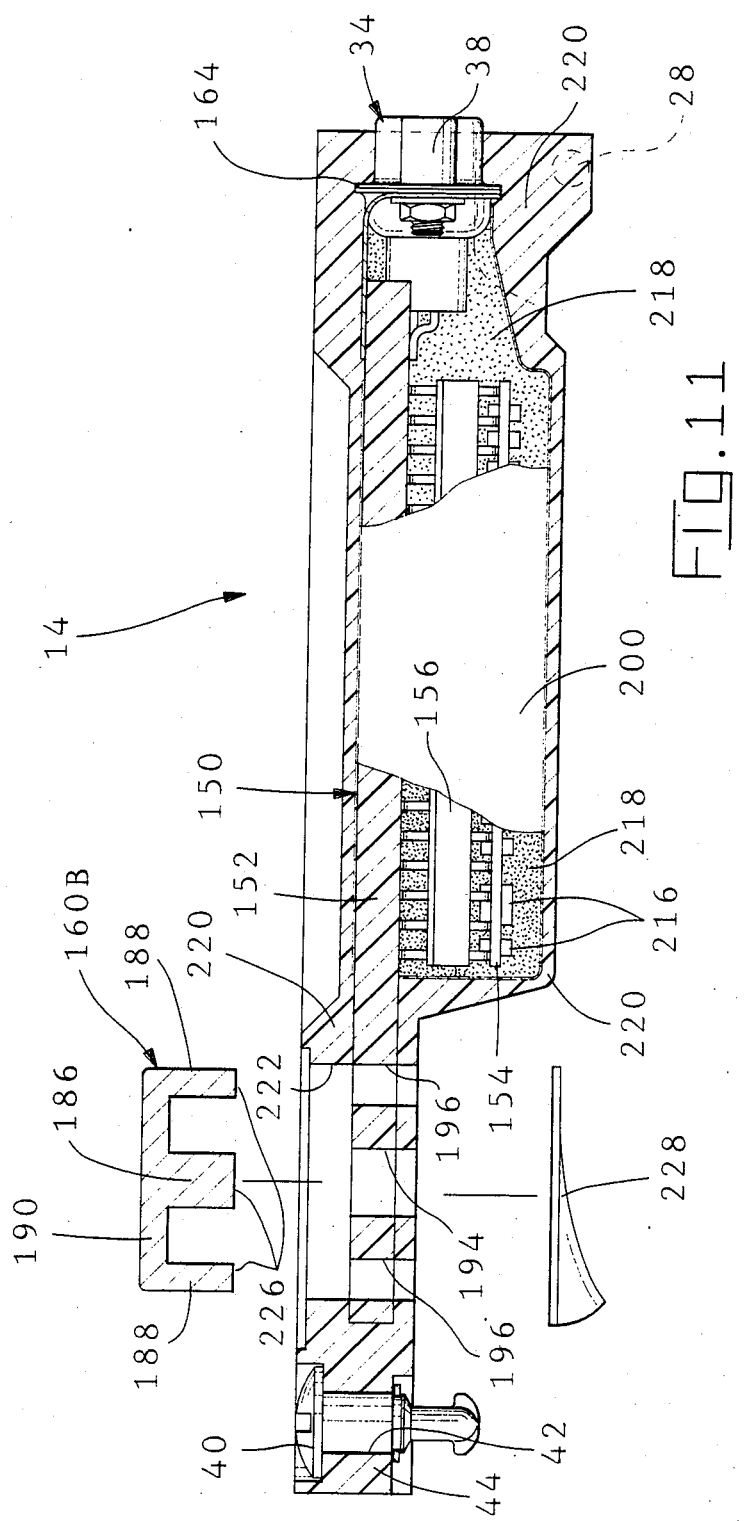

The various parts of upper member 14 of coupler assembly 10 are shown being assembled together in FIGS. 7 to 11. Electronic package 150 includes circuit substrate 152, component substrate 154, dual in-line (DIP-style) interconnector 156 electrically interconnecting component substrate 154 to circuit substrate 152, electrical connector 34 and mounting bracket 158 therefor, and a pair of E-shaped electromagnets 160A,160B (one of which is seen in FIG. 11) comprising preformed ferrite cores similar to electromagnets 92A,92B. Electrical connector 34 includes a dielectric housing 162 containing the plurality of terminals 36, and a metal shell 164 secured around housing 162 with a pair of mounting flanges 166 extending laterally to enable connector 34 to be secured to mounting bracket 158 by threaded inserts 38 having threaded rear shanks 168 extending through holes 170 of flanges 166 and holes 172 through tabs 174 of bracket 158 and nuts and washers threaded thereonto.

Metal shell 164 may comprise forward and rearward members which may be stamped and formed or cold-drawn of zinc-plated steel and clinched to each other as is conventionally known and provide a shielded receptacle hood 176 for receiving a plug section of the mating plug connector of a stub cable 408 of FIG. 1. Terminals 36 may have pin contact sections 178 extending forwardly within hood 176 for mating, and may have rearwardly extending feet 180 disposed aligned within a common plane comprising contact sections adapted for surface mount soldering to corresponding conductive pads 182 (FIG. 14) disposed on a surface adjacent the forward edge 184 of circuit substrate 152. Generally electrical connector 34 may be similar to a conventional type such as the Series 109 Connector (HDM-20) with right-angled posted contacts, sold by AMP Incorporated, Harrisburg, Penna. under Part No. 208932, although with the terminals having pin contact sections and preferably adapted for surface mounting.

Electromagnets 160A,160B each include inner leg 186 and two outer legs 188 extending from transverse portion 190. Coupling end 192 of circuit substrate 152 includes leg-receiving apertures 194,196 to receive inner legs 186 and outer legs 188 respectively of electromagnets 160A,160B therethrough. Shield member 200 for electronic package 150 generally has opposing side walls 202 defining a U-shaped channel 204 and having mounting flanges 206 therealong and is placed around the electronic package to shield the component substrate 154, referring to FIGS. 8 to 11. Shield member 200 includes a forward section 208 extending to electrical connector shell 164 to shield the terminations of contact sections 180 to conductive pads 182, and a rearward wall 210 concluding channel 204. Top surface 212 of circuit substrate 152, as well as that portion of bottom surface 214 along coupling end 192, is plated to provide EMI/RFI protection to the electronic package, in conjunction with shield member 200 and mounting bracket 158 which are preferably soldered thereto, and connector shell 164 which is in conductive engagement with tabs 174 of bracket 158. For best EMI/RFI protection, all seams between shield member 200, mounting bracket 158, connector shell 164 and the plating material of circuit substrate top surface 212 and bottom surface 214, are soldered continuously therealong.

In FIG. 10 component substrate 154 is shown having a plurality of electronic components 216 thereon and is electrically connected to interconnector 156 which is then mounted to lower surface 214 of circuit substrate 152 and electrically connected to circuitry thereof. Component substrate 154 and interconnector 156 are shown in greater detail in FIG. 14 and discussed in greater particularity with respect to FIG. 14. Circuit substrate 152 is shown in greater detail in FIGS. 14 to 16, and discussed in greater particularity with respect to those FIGS..

FIG. 10 illustrates dielectric potting compound 218 such as epoxy resin having been injected within the shield member 200 such as with a syringe, to embed and seal the electronic components 216 and contact terminations. The soldering of all seams of the shield with the circuit substrate, mounting bracket and connector shell provides an integral cavity for retention of the potting compound, as well as to provide a continuous three-dimensional shield surrounding the electronic package for EMI/RFI protection. The potting material is desirable to be resistant to thermal shock and to have a low coefficient of thermal expansion to minimize stressing the solder joints of the shielding, the terminations and the electrical components upon elevated temperature, and also be compatible with the coefficients of the circuit substrate, the component substrate, and the interconnector therebetween, and also the cover eventually molded over the assembly; elevated temperatures arise not only during in-service use but also during overmolding of the eventual cover. One such potting material is 4215 epoxy resin sold by Dexter Hysol Company of Olean, N.Y.

In FIG. 11 a dielectric cover 220 has been molded such as of polypropylene resin around the shielded and sealed electronic package 150 and outer surfaces of the electrical connector 34 rearward from the mating face thereof and the ends of inserts 38. Overmolding simplifies assembly, provides a durable protective covering solidly abutting all exposed surfaces of parts therewithin requiring covering, provides an integral seal therearound which seals all terminations and solder joints, and eliminates separate cover members needing to be latched or fastened together which could become delatched or the latching or fastening means damaged. Cover 220 includes pivot pins 28 (in phantom) and also defines end flange 44 having profiled aperture 42 therethrough, as well as recesses 222 to receive thereinto transverse portions 190 of electromagnets 160A,160B.

Electromagnet 160B is shown in FIG. 11 ready to be inserted into a recess 222 of upper member 14 after cover 220 has been molded thereto. After electromagnet insertion, potting material 224 (FIG. 12) such as epoxy is placed within recess 222 above the transverse portion 190 of the electromagnet securing it within upper member 14 and filling incremental spaces between electromagnet legs 186,188 and side walls of leg-receiving apertures 194,196. Potting material 224 must be compatible enough with the material of cover 220 to bond to side wall surfaces of recesses 222. End faces 226 of legs 186,188 preferably extend incrementally outwardly below the bottom surface of cover 220 and are preferably coated with a thin layer of grease to prevent oxidation of the ferrite material of the electromagnets; after assembly of the electromagnets into upper member 14 a protective cover 228 such as a piece of paper or plastic film for example is removably secured over the coated end faces 226 until final coupling of upper and lower members 14,16 at which time paper 228 is removed. Alternatively the dielectric cover may be molded after placement of the electromagnets into the upper member, eliminating the separate potting step. Upper and lower members 14,16 may preferably be placed in containers such as plastic blister packages for their protection prior to installation.

Figure 13:
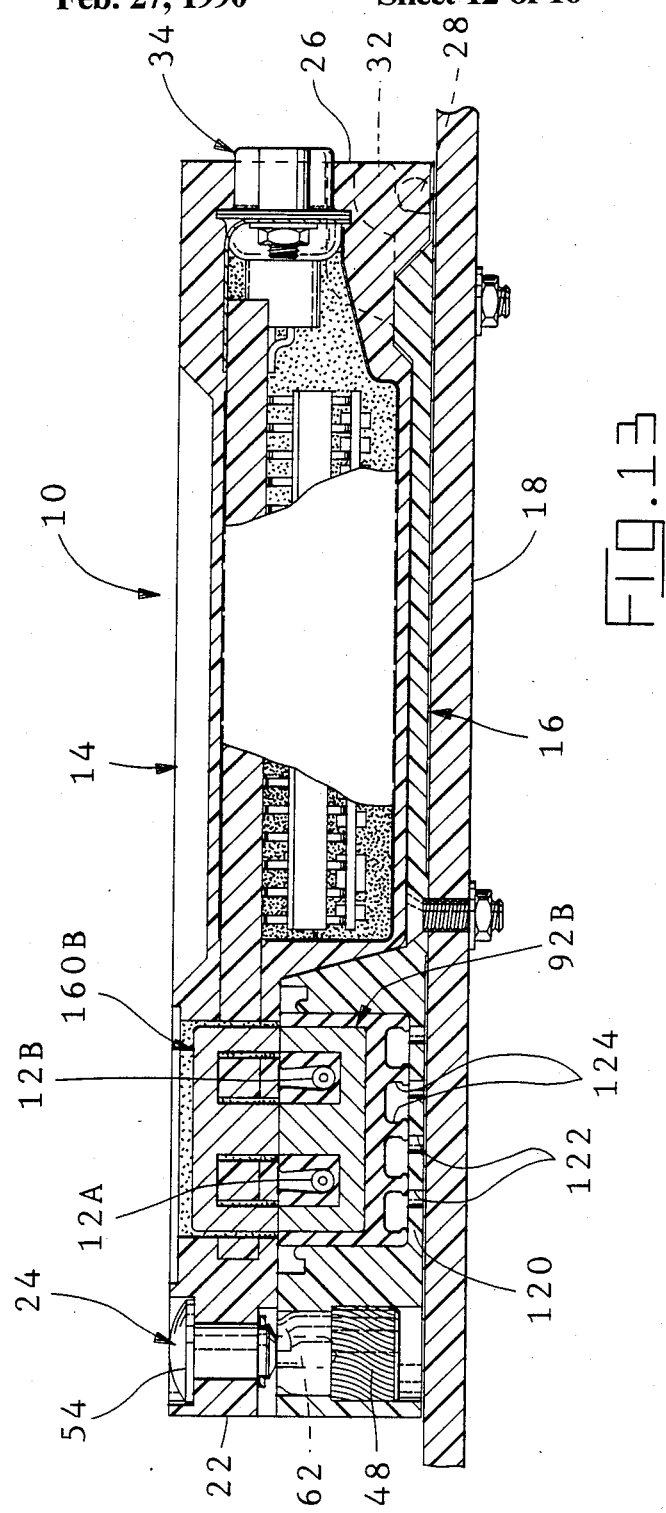

FIGS. 12 and 13 illustrate how upper and lower members 14,16 are finally secured together about wires 12A,12B. Screw 40 of fastener means 24 has been inserted into profiled aperture 42 through end flange 44, and hole portion 58 is dimensioned to be slightly larger than shaft portion 56 to allow rotation. C-shaped retention clip 46 secures within groove 60 to hold screw 40 in aperture 42. Protective papers are removed from the electromagnet end faces. Pivot pins 28 are placed in position below bosses 32 and against bearing surfaces 30 thereof, and upper member 14 is then pivoted so that electromagnets 160A,160B are moved toward electromagnets 92A,92B of lower member 16.

Locking end 62 of screw 40 enters socket section 64 of socket 48. During pivoting central section 230 of upper member 14 enters central recess 82 of lower member 16 between side walls 84, and the side surfaces of central section 230 engage side walls 84 and are aligned thereby to assure accurate alignment of upper member 14 with lower member 16 and of electromagnets 160A,160B with electromagnets 92A,92B. Preferably the inside portions of the upper edges of side walls 84 are chamfered to comprise lead-ins facilitating alignment of upper member 14 with lower member 16, and the forward and rearward ends of central recess 82 are tapered for noninterfering abutment, during pivoting of upper member 14 and engagement with lower member 16 prior to being secured together.

Figure 17:
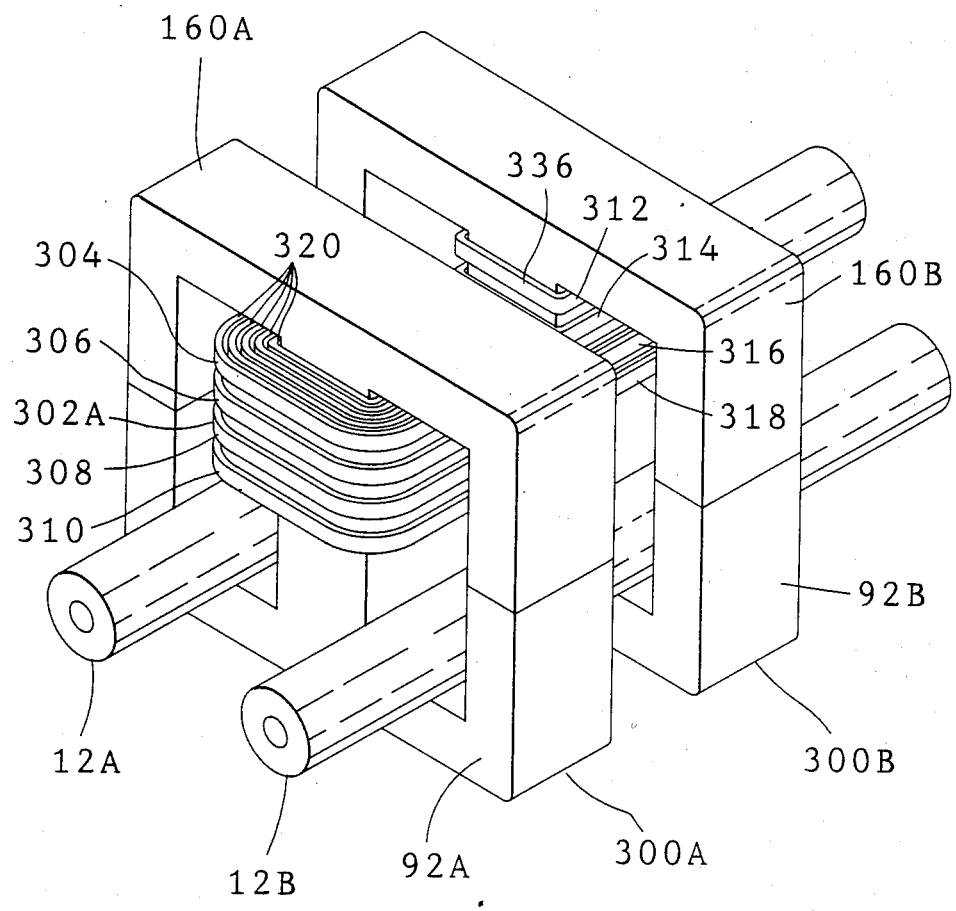
FIG. 17 is an illustration of the electromagnets and windings therearound, coupled to the data bus wires.

Electromagnet faces 226 engage corresponding electromagnet faces 102 to complete the formation of two electromagnet cores 300A,300B about wires 12A,12B, illustrated in FIG. 17. A first core 300A comprising electromagnets 92A,160A is a receiving core, and a second core 300B comprising electromagnets 92B,160B is a transmitting core. Slightly raised electromagnet insert 90 is urged further into insert-receiving cavity 86 of lower member 16 when upper member 14 is locked into place by screw 40 being rotated through a 90° turn for example thereby rotating locking wing tabs 66 into locking position behind and beneath corresponding locking bosses 70 of socket 48. Lateral ribs 124 become slightly deformed under compression against bottom cavity wall 120 and apply continuous slight bias of electromagnet faces 226,102 against each other after assembly.

Electromagnets 92A,92B;160A,160B may be of the type sold by Ferroxcube Division of Amperex Electronic Corporation of Saugerties, N.Y.; they may be made from conventional material such as linear ferrite, a ceramic filled with ferrous particles, with faces 102 preferably smooth and precisely coplanar and faces 226 preferably smooth and precisely coplanar. The thin layer of grease used to protect end faces 102,222 from oxidation and remaining after the protective papers are removed, will not detract from the electromagnetic field generated by the electromagnets. It is preferable that bosses 32 at connector end 26 of coupler assembly 10 be of sufficient height that the chances of misassembly are minimized: if pivot pins 28 are not secured below bosses 32 but instead are disposed above them when screw 40 is locked into socket 48 at coupler end 22, pivot pins 28 will create a space at the connector end 26 of the assembly sufficient to generate a slight gap between he electromagnet faces which would be detectable by testing equipment during testing prior to in-service use, allowing proper assembly then to be made.

Figure 14:
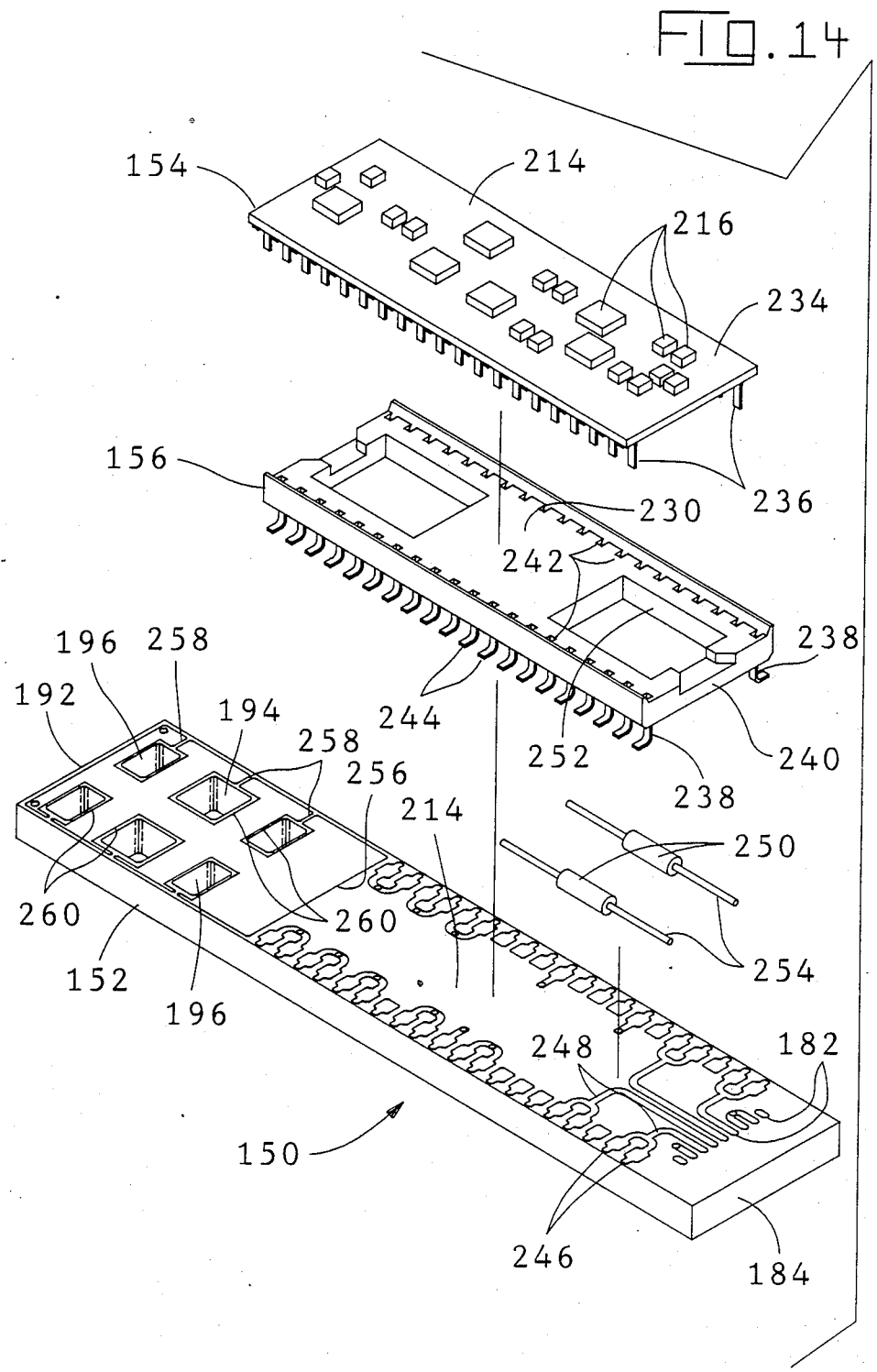
FIG. 14 is an isometric view of the electronic package of the upper member being assembled, including a component substrate, a circuit substrate and an interconnector therebetween.

Details of the electronic package 150 and assembly thereof are illustrated in FIG. 14, which is a view of the relatively lower side 214 of circuit substrate 152, lower side 230 of connector 156 and lower side 232 of component substrate 154. Component substrate 154 includes a circuit-bearing member 234 to which are secured a plurality of electronic components 216 such as capacitors, resistors, transistors, diodes and so on, defining amplifier circuits appropriate for signal amplification. Power is provided to the coupler assembly by the control unit through electrical connector 34 of upper coupler member 14, and chassis grounding is also provided thereby. Signals received from the data bus are amplified for transmission to the control unit; signals are also received from the control unit and are amplified to be sent along the data bus.

Transmitted signals are preferably of the Manchester Encoded Signal type, encoded as such within the control unit 410 of FIG. 1 such as by means of a Serial Interface Module. The electronic package may also have appropriate circuits and components to provide the coupler assembly with redundant receiving and transmitting capability. Circuit-bearing member 234 is shown to be of the type having terminal posts 236 electrically connected to components 216 by traces (not shown) as desired and extend outwardly therefrom to be electrically connected with contact means of connector 156.

DIP style interconnector 156 includes a plurality of contacts 238 secured within a dielectric housing 240 and arranged in two rows as is conventional, such as a 40-position DIP connector sold by AMP Incorporated of Harrisburg, Penna. under Part No. 205817-8. Housing 240 is shown to be the type including receptacles 242 in lower side 230 into which terminal posts 236 of circuit-bearing member 234 of component substrate 154 are insertably received to electrically engage socket sections of contacts 238 and be soldered thereto. Contacts 238 each have a surface mount foot contact section 244 extending to circuit substrate 152 for electrical connection with pads 246 of conductive paths 248 along lower surface 214 by surface mount soldering. DIP-style interconnector 156 could optionally be of the type adapted for surface mount connection with the terminals of the component substrate, or also may have terminals having contact sections adapted for surface mount soldering to conductive pads along the upper surface of the component substrate.

Capacitors 250 are shown which are electrically connected to appropriate ones of terminals 238 of connector 156 for power storage utilized to assist in energizing the amplification circuits; capacitors 250 are preferably disposed within recess 252 to maintain the low profile of the electronic package 150, and leads 254 thereof can be conventionally soldered to the respective terminals 238.

Figure 15:
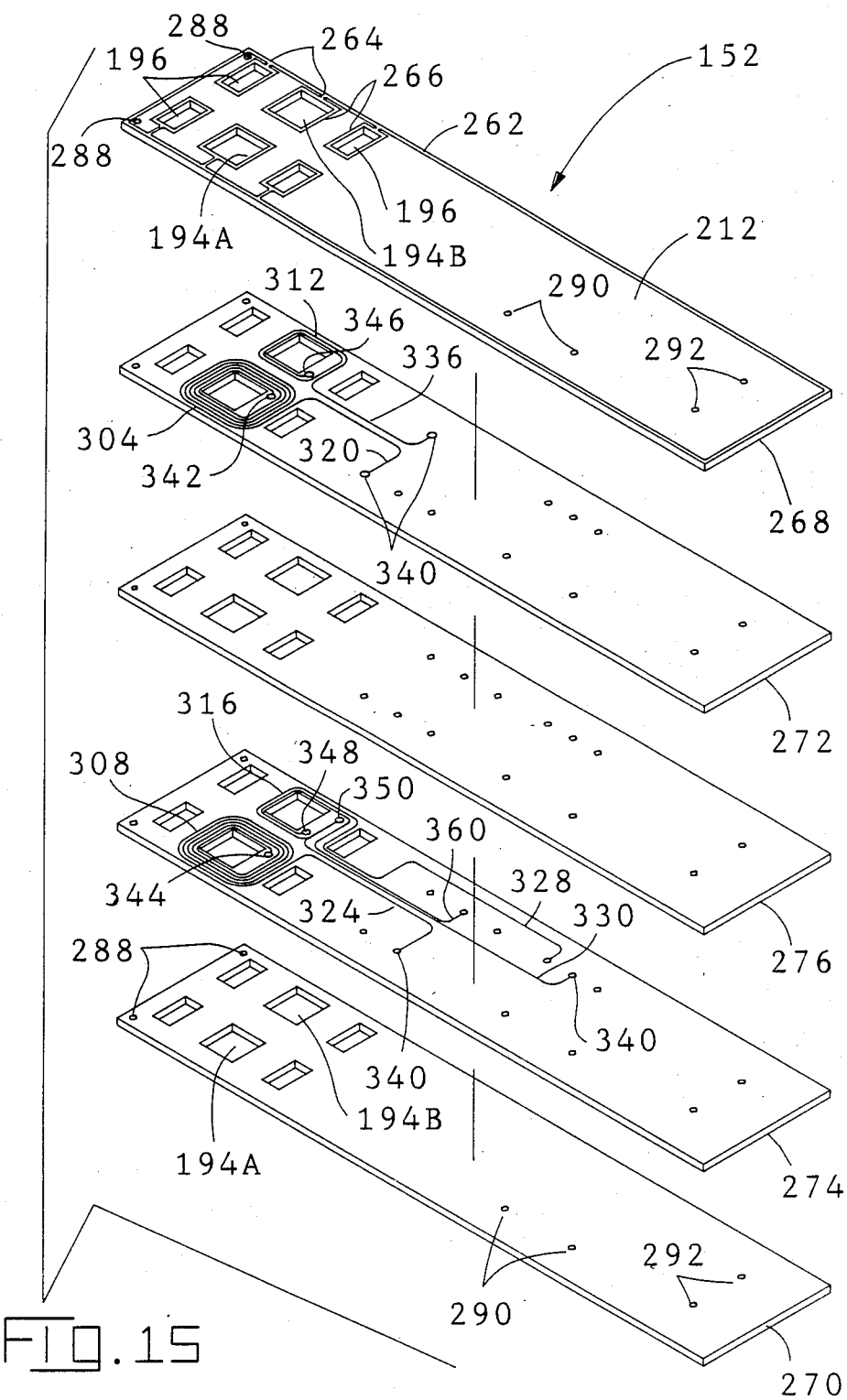
FIGS. 15 and 16 are isometric views the layers of the circuit substrate of FIG. 14, showing the top and bottom surfaces thereof and the inductance coils for the electromagnets.
Figure 16:
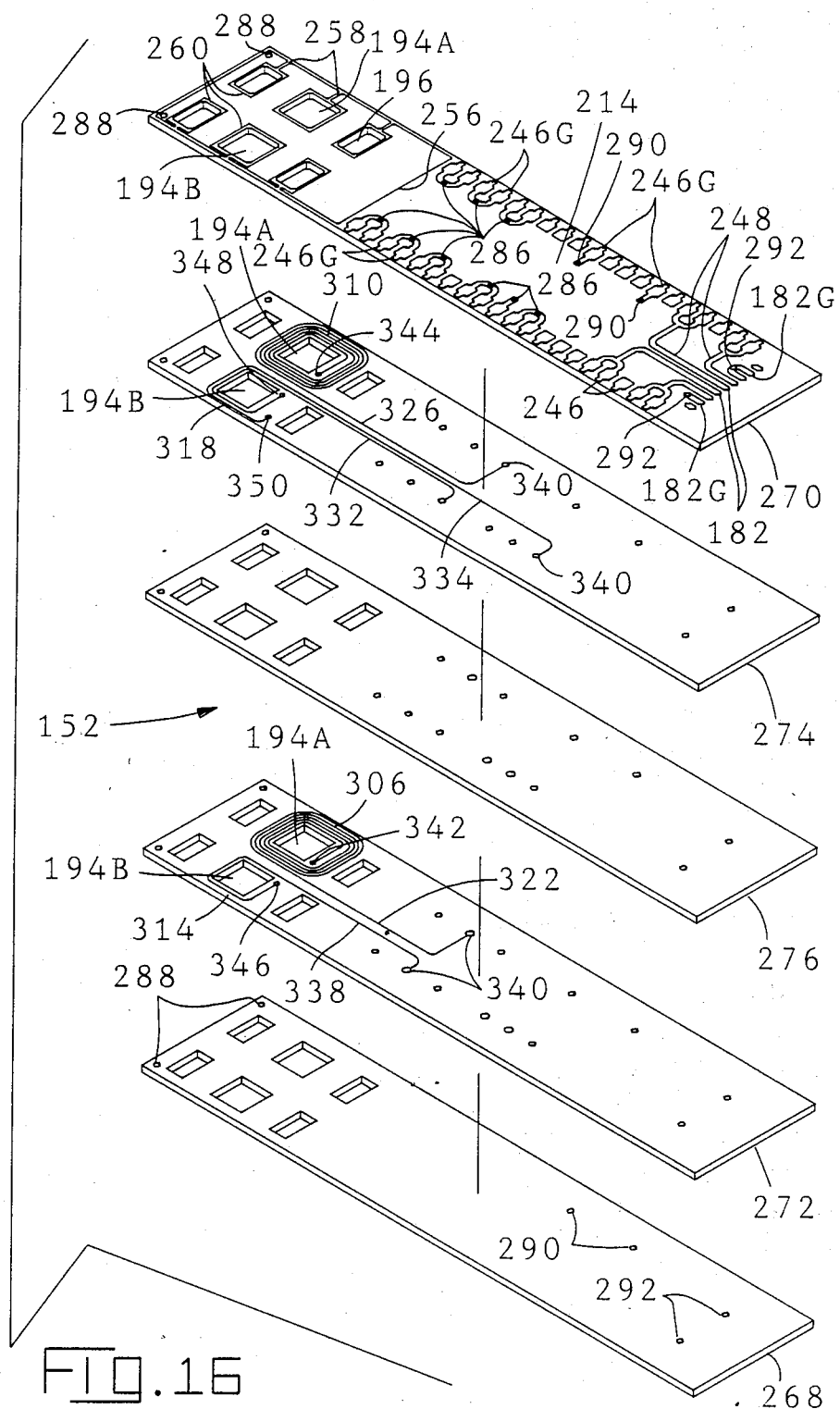

Referring to FIGS. 14 to 16, lower surface 214 of circuit substrate 152 preferably includes plating material 270 about the leg-receiving apertures 194,196 at coupling end 192 for shielding. Plating material 256 is discontinuous at gaps 258 adjacent each leg-receiving aperture 194,196 to prevent formation of a continuous winding about legs 186,188 of electromagnets 160A,160B which could dissipate and/or interfere with the electromagnetic field induced in the electromagnet cores 300A,300B during in-service use, and thereby interfere with the signal. The plating material also extends to but stops just short of the periphery of each leg-receiving aperture 194,196 forming peripheral plating gaps 260. Peripheral plating gaps 260 disallow conductive engagement of the plating material with the electromagnet legs 186,188 once the electromagnets 160A,160B are in place minimizing the formation of unwanted coils and any inductance generation thereby. Similarly, in FIG. 15 plating material 262 on top surface 212 of circuit substrate 152 includes gaps 264 and peripheral gaps 266 for similar reasons. Incidental inductance effects of engagement of transverse portions 190 with plating material 262 along top surface 212 are believed to be minimal.

FIGS. 15 and 16 show the several layers comprising circuit substrate 152, with their upper surfaces shown in FIG. 15 and their lower surfaces shown in FIG. 16. Uppermost layer 268 (shown lowermost in FIG. 16) includes plating material 262 for shielding; lowermost layer 214 includes plating material 270 and conductive pads 182 and 246, and conductive paths 248. Third and fourth layers 272,274 include trace circuit paths comprising the inductance coil windings, and between layers 272,274 is a dielectric mat 276 of for example heat resistant thermoplastic film or glass fibers embedded in epoxy to isolate the circuitry on their facing surfaces. The trace circuit paths of third and fourth layers 272,274 are disposed on respective upper surfaces 278,280 (FIG. 15) and lower surfaces 282,284 (FIG. 16) thereof respectively, and together upon assembly will define inductance coils 302A,302B (FIG. 17) about central apertures 194A,194B respectively extending in alignment through all layers. Inductance coil 302A thus comprise four planes 304,306,308,310 of parallel trace coils, and inductance coil 302B comprises four planes 312,314,316,318 of parallel trace coils. Each trace coil on each plane of coil 302A is shown to comprise a single trace 320,322,324,326 wound five times about a respective aperture 194A; thus coil 302A comprises twenty windings. Each trace coil of coil 302B on plane 316 is shown to comprise two separate traces 328,330 each wound once about a respective aperture 194B; on plane 318 to comprise two separate traces 332,334 each wound once; and on planes 312,314 a single trace 336,338 wound once respectively.

The traces on opposite surfaces of a single layer can be interconnected at the trace ends by locating the ends to be interconnected to be in alignment vertically and conventionally drilling and plating conductive via holes through the layer, thus conductively joined to the respective traces. Similarly, trace ends of traces on adjacent layers can be interconnected after the layers are bonded together by drilling and plating conductive via holes through both layers, conductively joining all traces intersected by the via holes.

Conductive pads 246 on lower surface 214 of lowermost layer 270 can be interconnected to appropriate traces of all planes by via holes by vertically aligning the respective first trace ends 340 with the appropriate pad 246 to be intersected by the via hole 286 connected to that pad. In this manner the traces are electrically connected to appropriate contacts 238 of interconnector 156 and to appropriate contacts 236 of component substrate 154. Via holes 286 are formed and plated after layers 270,272,274 and mat 276 are secured together.

Second trace ends 342 of traces 320,322 are interconnected by a via hole through third layer 272; second trace ends 344 of traces 324,326 are interconnected by a via hole through fourth layer 274. Both interconnections place the two planes of windings 304,306 and 308,310 into continuous ten-winding coils, each of the windings of each plane spiralling about the aperture and the electromagnet leg continuing in the same direction as the other. One of the ten-winding coils is operable during reception of the positive half of the signal doublet, and the other during reception of the negative half of the signal doublet. Trace ends 340 of traces 320 and 326 are electrically connected to respective amplifier circuits of component substrate 154, while trace ends 322,324 are both connected to a power source for powering the transistors of the amplifier circuits.

Second trace ends 346 of traces 336,338 are interconnected by a via hole through third layer 272; second trace ends 348 of traces 328,332 are interconnected by a via hole through fourth layer 274. Both interconnections place the two trace windings of each of the two pairs in series to generate and transmit the positive and negative halves of the transmitted signal doublet respectively. First trace ends 340 of traces 328,338 are connected to respective amplifier circuits, while first trace ends of traces 332,336 are connected to ground. First trace end 340 of trace 360 is shown connected to virtual ground.

Traces 330 and 334 are interconnected at their second trace ends 350 by a via hole through fourth layer 274; trace coils 330,334 are electrically interconnected and are connected at first trace ends 352 thereof to transistors on the component substrate selected to have low conduction impedance and connected appropriately to detect a power failure situation with the control unit and thereupon to complete the conductive path. The winding thereby comprises a short circuit which is active upon power failure of the control unit to which the coupler assembly is connected to reduce to a minimal level the impedance on the data bus cable 12 because even without power the electromagnet otherwise would generate high impedance to undesirably affect signal transmission merely passing through the coupler.

Finally, plated through-holes can electrically connect the plating material 262 on upper surface 212 of uppermost layer 268 and plating material 256 of lower surface 214 of lowermost layer 270, to each other at plated through-holes 288 and to ground conductive pads 246G at plated through-holes 290; and plating material 262 directly by plated through-holes 292 to ground conductive pads 182G at ground ones of terminals 36 of electrical connector 34. Plated through-holes 288,290,292 are formed and plated after all layers are secured together.

Referring to FIG. 17, multi-layer inductance coil 302A will surround central leg 186 of electromagnet 160A and multi-layer inductance coil 302B will surround central leg 186 of electromagnet 160B upon complete assembly of upper member 14. By virtue of having twenty windings, with each of the four coil layers 304,306,308,310 having five windings, inductance coil 302A is sensitive in receiving signals from the data bus, and the signals are then amplified by the component substrate to be sent to the respective control unit. Inductance coil 302A will receive all signals sent along the data bus, including those transmitted by inductance coil 302B of the same coupler assembly 10, which will provide verification in the control unit 410 for the coupler assembly 10 that the appropriate signal was in fact sent and with enough strength.

Since inductance coil 302B is utilized for signal transmission rather than reception, fewer windings are necessary since the strength of the signal is controlled directly by amplifiers in the component substrate, and each of four coil layers 412,414,416,418 have only one winding active during signal reception for a total of four. Coil layers 316,318 have two windings; as a result, less circuit substrate width is needed about the inner legs 186,188 of electromagnet 160B than about those of electromagnet 160A, and wires 12A,12B may exit coupler assembly 10 closer to electromagnet 92B and thus are shown spaced further apart needing a wire-receiving slot 118 wider than slot 116 associated with electromagnet 92A, referring to FIG. 3; this results in minimized coupler assembly width if desired.

There are modifications and variations which may be made to the preferred embodiment described herein, such as providing a electronic package connectable directly to circuitry of a circuit substrate without an interconnector, or providing a different connector interface for connection to the stub cable of the control unit, or providing different fasteners, all of which may be made without departing from the spirit of the invention or the scope of the claims.

What is claimed is:

1. A coupler assembly for coupling to a data bus system having a twisted pair of signal conductor wires in a closed loop, to receive and transmit signals therealong with minimal dissipation of signal strength and minimal interference with such signals, and adapted to be electrically connected to a control unit receiving and generating such signals for the data bus, the coupler assembly comprising:

a pair of electromagnet cores defined by pairs of first and second electromagnets each having an E-shape formed of a central and two outer legs having mating end faces forming closed loops upon mating about the spaced apart conductor wires of a twisted pair data bus;

a lower dielectric member within which said first electromagnets are disposed at a coupling end thereof oriented parallel to each other with mating end faces exposed along an upwardly facing planar surface having wire-receiving channels defined thereinto coursing from a first side to a second side of said lower member and between said central legs and associated outer legs of said parallel first electromagnets, said lower member including a first fastener means at said coupling end and a first securing means at a second end opposed from said coupling end; and an upper member within which said second electromagnets are disposed at a coupling end thereof, said upper member including a second fastener means at said coupling end adapted to cooperate with said first fastener means to fasten said upper and lower members together at final assembly, said upper member further including a second securing means at a second end opposed from said coupling end adapted to cooperate with said first securing means to secure said upper and lower members together at final assembly;

said upper member including an electrical connecting means at said second end having a mating interface adapted to mate with a corresponding connecting means electrically connected to a control unit, said upper member further including an electronic subassembly having electrical and electronic components and circuit means thereof electrically connected to said electrical connecting means and defining amplifier circuits for amplifying said received signals and signals to be transmitted, and said upper member further including a circuit-bearing substrate having circuits electrically connected to other circuit means of said electronic subassembly for electronic connection with said components, said circuits of said circuit-bearing substrate also establishing windings about central legs of said second electromagnets thereby inductively coupling thereto;

said upper member having shielding means surrounding said electronic subassembly and said electrical connecting means rearwardly from said mating interface, and said upper member further having integral cover means surrounding and housing said electrical connecting means rearwardly from said mating interface, surrounding and housing said electronic subassembly and said circuit-bearing substrate and said shielding therearound, and surrounding and housing said second electromagnets exposing said mating end faces thereof along a downwardly facing planar surface; and said upper and lower members adapted to be assembled and fastened together such that said mating electromagnet end faces engage each other forming said electromagnet cores about said conductor wires disposed along and within said wire-receiving channels, whereby signals transmitted along said conductor wires are sensed by windings of one of said electromagnet cores and amplified by said coupler assembly and transmitted to said control unit, and signals desired to be sent along the data bus by said control unit are amplified by said coupler assembly and sent by the other of said electromagnet cores.

2. A coupler assembly as set forth in claim 1, wherein said first electromagnets cores are supported by resilient means and the legs thereof extend slightly above said upwardly facing surface of the lower member for the mating end faces thereof to be engaged by mating faces of said second electromagnet legs, and said first electromagnets cores to be urged incrementally downwardly during mating against said resilient means, thereby establishing slight compressive force urging the mating end faces against each other thereafter.

3. A coupler assembly as set forth in claim 1 wherein said wire-receiving channels are slightly arcuate outwardly approximating the shape of an optimum-shaped loop of the twisted pair cable of the data bus, minimizing impedance and signal reflection when the conductor wires are placed therein and therealong.

4. A coupler assembly as set forth in claim 2 wherein said first electromagnets are embedded within elastomeric material defining an electromagnet insert shaped to be received in interference fit within a corresponding insert-receiving cavity in said coupling end of said lower member, said elastomeric material exposing said mating end faces of said first electromagnet legs, and said elastomeric material including defined thereacross said wire-receiving channels alignable with corresponding wire-receiving slots in side walls of said insert-receiving cavity.

5. A coupler assembly as set forth in claim 1 wherein said first and second fastener means together comprise a fastener assembly adapted to be disengaged allowing disassembly of said upper member from said lower member.

6. A coupler assembly as set forth in claim 1 wherein said mating end faces of said first and second electromagnets are protected against oxidation after assembly to said lower and upper members respectively prior to coupler assembly.

7. A coupler assembly as set forth in claim 1 wherein said first securing means comprise a pair of bosses at said second end of said lower member defining arcuate bearing surfaces facing downwardly and outwardly away from said second end, said second securing means comprise a pair of coaligned pivot pins at said second end of said upper member proximate a lower surface of said upper member and extending outwardly from sides thereof, and said lower member being adapted to receive said pivot pins against said arcuate bearing surfaces during assembly for rotation of said upper member with respect to said lower member prior to fastening of said first end second fastening means together.

8. A method of making an upper member of a coupler assembly having a pair of E-shaped electromagnets matably engageable with a corresponding pair of E-shaped electromagnets of a lower member, for noninvasively coupling to a pair of conductor wires of a twisted pair data bus and sensing and transmitting signals therealong in cooperation with a control unit, the upper member including an electronic subassembly containing electrical and electronic components and circuits defining amplifier circuits for amplifying said sensed signals and signals to be transmitted, a circuit-bearing substrate including circuits defining windings about central legs of said pair of electromagnets and electrically connected to said electronic subassembly, and further including an electrical connector for electrical connection with the control unit, and further providing shielding and covering about the parts thereof, the method comprising the steps of:

securing the electrical connector to the circuit-bearing substrate and electrically connecting contact means of the electronic subassembly to appropriate contact means of the electrical connector and to appropriate circuit means of the circuit-bearing substrate;

securing a shield member to the circuit-bearing substrate about said electronic subassembly and said electrical connector rearwardly from the mating interface thereof, and joining edges of said shield member to ground plating material of outwardly facing surfaces of the circuit-bearing substrate to establish a continuous shield about the electronic subassembly and electrical connections thereof;

potting with dielectric material of low thermal expansion characteristics the interior of the shield member and about the electronic subassembly and electrical connections;

molding a dielectric cover about the shield member, the electrical connector rearwardly from the mating interface thereof, and the exposed surfaces of the circuit-bearing substrate, and providing electromagnet-receiving recesses in communication with leg-receiving apertures through the circuit-bearing substrate and defining a downwardly facing planar mating face adapted to be coplanar with exposed mating end faces of legs of the electromagnets, and further defining means cooperable with fastening means for securing the upper member thus defined to a lower member having cooperable fastening means; and placing the electromagnets into said electromagnet-receiving recesses such that the legs thereof extend through said leg-receiving apertures and mating end faces thereof are not recessed below said planar mating face, and potting the electromagnets in said recesses securing them within the upper member.

9. A method of assembly an upper member to a lower member of a data current coupler of the type having a pair of electromagnet cores defined by pairs of matable E-shaped electromagnets to couple about a pair of conductor wires of a twisted pair cable of a data bus system to sense and transmit signals therealong, the upper member including upper ones of the pairs of electromagnets at a coupling end thereof, a circuit-bearing substrate providing circuits defining windings about the central legs of the electromagnet cores, an electronic subassembly including electrical and electronic components and circuits defining amplifier circuits to which the windings are electrically connected, and means for electrically connecting circuits of the electronic subassembly at an interface with connecting means of a control unit; and the lower member including lower ones of the pairs of electromagnets at a coupling end thereof, wire-receiving channel means through legs of the lower electromagnets, said lower member to be mounted to a panel at a selected location along said twisted pair cable and said conductor wires to be disposed along and within said wire-receiving channel means, the method comprising the steps of:

providing a first fastener member at the coupling end of the upper member and a cooperable second fastener at the coupling end of the lower member, said first and second fastener members adapted to be fastened together upon the respective coupling ends of the upper and lower members being placed together;

providing first pivot means at a second end of the upper member opposed from the coupling end thereof and cooperable second pivot means at a second pivot means at a second end of the lower member opposed from the coupling end thereof;

after said lower member has been mounted to the panel and the conductor wires disposed along and within the wire-receiving channel means, orienting the upper member with the lower member with respective said coupling ends thereof spaced apart, respective said second ends thereof adjacent each other, and said first and second pivot means in pivotable relationship; and rotating the upper member about said first and second pivot means and said upper member coupling end toward and against said lower member coupling end and fastening said first and second fastening means together, thereby securing the upper and lower members together with the pairs of electromagnets mating and defining continuous electromagnet cores about the conductor wires disposed along and within said wire-receiving channel means.

10. A method as set forth in claim 9 wherein said providing step comprises:

providing a pair of coaligned pivot pins at said second end of the upper member, said pivot pins being proximate the lower surface of the upper member and extending outwardly from sides thereof; and providing a pair of bosses at said second end of the lower member defining arcuate bearing surfaces associated with said pair of pivot pins of the upper member and facing downwardly and outwardly away from the second end, said lower member being adapted to receive said pivot pins against said arcuate bearing surfaces during assembly for rotation of the upper member with respect to the lower member.

UNITED STATES PATENT AND TRADEMARK OFFICE
CERTIFICATE OF CORRECTION

PATENT NO. : 4,904,879

DATED : February 27, 1990

INVENTOR(S) : William J. Rudy Jr. and Howard R. Shaffer

It is certified that error appears in the above-identified patent and that said Letters Patent is hereby corrected as shown below:

ON TITLE PAGE:

Inventors name was mispelled: Not "Shafter" - Should be "Shaffer".

Column 12, lines 41 and 46 - Delete the word "cores" in both lines.

Signed and Sealed this

Thirteenth Day of August, 1991

Attest:

HARRY F. MANBECK, JR.

*Attesting Officer*    *Commissioner of Patents and Trademarks*